United States Patent [19]

Tanide et al.

[11] Patent Number: 5,500,747
[45] Date of Patent: Mar. 19, 1996

[54] ULTRA-WIDE ANGLE LIQUID CRYSTAL PROJECTOR SYSTEM

[75] Inventors: Hideo Tanide; Masayuki Muranaka, both of Yokohama; Shigeru Mori, Chigasaki; Kiyoshi Wada, Yokohama; Isao Yoshizaki, Yokohama; Naoyuki Ogura, Yokohama, all of Japan

[73] Assignees: Hitachi, Ltd.; Sega Enterprises, Ltd., both of Tokyo, Japan

[21] Appl. No.: 294,509

[22] Filed: Aug. 23, 1994

[30] Foreign Application Priority Data

Aug. 24, 1993 [JP] Japan ................................ 5-209064

[51] Int. Cl.⁶ .................................................. G02F 1/1335
[52] U.S. Cl. ............................ 359/40; 359/41; 359/451; 353/79; 353/94; 353/122
[58] Field of Search ................................ 359/40, 41, 451; 353/79, 94, 122

[56] References Cited

U.S. PATENT DOCUMENTS 4,772,098  9/1988  Ogawa ........................... 359/40
4,936,657  6/1990  Tejima et al. ..................... 353/102
5,390,048  2/1995  Miyatake et al. ................. 359/651

FOREIGN PATENT DOCUMENTS 0239007   9/1987  European Pat. Off. ............. 359/40
62-159120 7/1987  Japan.

OTHER PUBLICATIONS

Gendai Camera Shinsho No. 76—Introduction to the Science of Lens (Last Volume), by Toshinobu Ogura, pp. 92–95.

Primary Examiner—Anita Pellman Gross
Assistant Examiner—Fetsum Abraham
Attorney, Agent, or Firm—Antonelli, Terry, Stout & Kraus

[57] ABSTRACT

An ultra-wide angle liquid crystal projector system comprising a light source, a liquid crystal panel, a curved screen, and a projection lens for projecting in accordance with light emitted by the light source an image formed on the liquid crystal panel onto the curved screen. The projection lens has a curvature of field substantially conforming to the shape of the curved screen and an angle of projection of at least 120 degrees. The projection lens is disposed with respect to the curved screen so that a distance from an exit surface of the projection lens to the curved screen is less than 3 meters.

15 Claims, 5 Drawing Sheets

ULTRA-WIDE ANGLE LIQUID CRYSTAL PROJECTOR SYSTEM

FIELD OF THE INVENTION

The present invention relates to an ultra-wide angle liquid crystal projector system for projecting an image which has been formed on a liquid crystal panel by inputting a picture signal, such as a video signal to the panel, onto a screen on an enlarged scale. In particular, the invention is concerned with an ultra-wide angle liquid crystal projector system suitable for use of a game system or an audio-visual system, capable of affording images full of a sense of presence, and rich in variety of amusement.

BACKGROUND OF THE INVENTION

Figure 2:
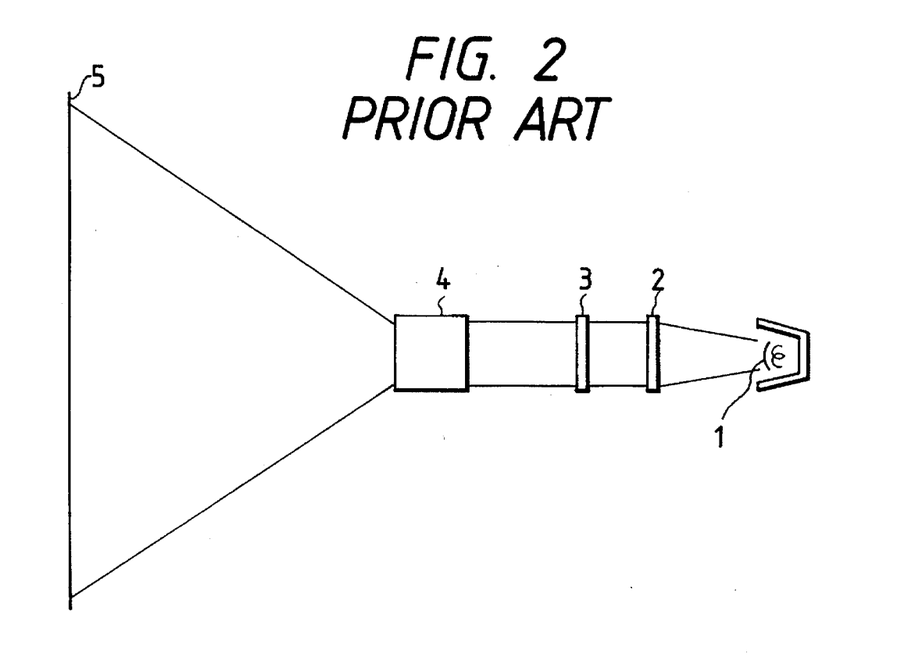
FIG. 2 is a schematic diagram of a conventional liquid crystal projector system.

A conventional projector system for obtaining an image over a large screen using a liquid crystal, is described in Japanese Patent Laid Open No. 159120/87. FIG. 2 is a schematic construction diagram of such a conventional liquid crystal projector system wherein light emitted from a light source 1 is condensed by a lens 2 and then an image formed on a liquid crystal panel 3 by the light beam from the lens 2 is projected enlargedly onto a screen 5 through a projection lens 4. This system enables a planer image as large as 100 inches in the length of a diagonal line. It is noted that the light source 1, lens 2, liquid crystal panel 3 and projection lens 4 are generally contained in a single housing which also contains a cooling device and thereby heat and noise are generated in such housing.

As a related conventional projector, there is known an all sky projector using a planetarium as a structural building, for example, such as that described on page 95 of Gendai Camera Shinsho No. 76—Introduction to the Science of Lens (Last Volume)—by Toshinobu Ogura (publisher: Asahi Sonorama Co.). Further, there is described a liquid crystal projector system using a fish-eye lens, in Japanese Patent Laid Open No. 80239/91. According to this technique, the fish-eye lens forms a part of the projector body and is disposed proximate to the head of the viewer whereby, the viewer is provided with more realistic images having a sense of presence.

For obtaining an image over a large screen of 100 inches in diagonal length with the above-mentioned conventional liquid crystal projector systems, it is required to provide a sufficient projection distance on the order of 3 to 4 meters from the projection lens 4 to the screen 5. Consequently, when the system is in use, it is necessary to provide a large space almost equal to one six-mat room of the Japanese standard measurement or approximately 10 m².

On the other hand, in order to use such a large screen projector system as a game system for the pleasure of many people, it is necessary to make the system into a compact system requiring only a small projection space which permits indoor installation as in a so-called game center. Besides, it is desired that the system permit one or more persons to enjoy it and that the system provide variety of amusement to many people through the transmission of many pieces of information.

For an image viewer who plays a game, it is necessary to ensure an appropriate space and improve comfortableness so that the viewer does not have a sense of oppression or unpleasant feeling. In the case of an all sky projector used in a planetarium, for example, where a sufficient space for the viewer is ensured, since the planetarium is a structural building, such a projector system is not easy to manufacture industrially and requires a large amount of space not suitable for the game usage.

SUMMARY OF THE INVENTION

It is an object of the present invention to provide a liquid crystal projector system which permits a reduction of the necessary projection space, is suitable for industrial projection and can provide images having a sense of reality.

It is another object of the present invention to provide a system which, in its projection space, ensures a user a comfortable space free from a sense of oppression or unpleasant feeling in the presence of a projector body, as well as a system rich in the variety of amusement through the transmission of many pieces of information to a user.

According to the present invention, there is provided a liquid crystal projector system wherein there is used a projection lens, e.g. fish-eye lens, having a curvature of field approximately conforming to the shape of a curved screen and having an angle of projection of not smaller than 120 degrees. Further, as the curved screen there is a used a dome-like screen, and the distance from the exit surface of the projection lens to the screen is set at about 0.3 to 2 meters, preferably 0.6 to 1.5 meters.

According to a feature of the present invention, a back focal length of the projection lens in the direction of the liquid crystal panel is set at a value of 0.1 to 2.2 meters, preferably 0.2 to 1.2 meters and/or the angle between an optical axis of light emitted from the projection lens and a perpendicular line extending from the center of the screen, namely, the degree of decentering, is set at a value exceeding 20 degrees.

In accordance with the other features of the present invention, the surface of the screen is provided with an autoluminous display element or a light transmitting display element and/or there is used a information projecting portion for projecting on the screen a new piece of information different from the image projected on the screen through the projection lens.

In the ultra-wide angle liquid crystal projector system of the present invention, there is used a projection lens, e.g. fish-eye lens, having a curvature of field approximately conforming to the shape of the screen and having an angle of projection of not smaller than 120 degrees, and thus, the angle of projection is much wider than that of 35 to 45 degrees of the projection lens used in the conventional liquid crystal projector system, so by shortening the projection distance from the projection lens up to a large screen of 100 inches or more in the length of a diagonal line (aspect ratio 3:4, corresponding to a curved surface length of a dome-like screen), it is made possible to reduce the space occupied by the system during projection. Moreover, the use of projection lens permits the projection distance from the projection lens to the screen to be set at a value of not larger than 1.5 meters, whereby the overall system length can be made 3 meters or so. Such an ultra-wide angle liquid crystal projector system can be used for the pleasure of many people because it can be installed indoors as in a game center. Further, unlike structural buildings, the system can be constructed as a relatively small-sized system of about the size of a small-sized automobile, thus having industrial productivity.

In the projector body extending from the light source to the liquid crystal panel, there are present both heat from the light source and noise generated from a cooler device for reducing the generated heat. If both the heat and noise are transmitted to the image viewer who plays a game, the viewer will have an unpleasant feeling. In view of this point, by making the back focus of the projection lens long so as to permit a construction wherein the projector body is positioned behind the viewer, it is made possible to provide a comfortable space not giving unpleasant feeling to the viewer. Moreover, by installing the projector body extending from the light source to the liquid crystal panel in such a manner that the angle between the optical axis of light emitted from the projection lens and the normal line extending from the center of the screen, namely, the degree of decentering, exceeds 20 degrees, it is also made possible to ensure a comfortable space not giving unpleasant feeling to the viewer who plays a game.

Further, by adopting the construction wherein the screen surface is provided with an autoluminous display element or a light transmitting display element, and/or the construction including the foregoing information projecting portion, it becomes possible to provide the viewer with a new piece of information different from the image projected on the screen through the projection lens, and thus it is possible to realize a game system rich in variety of amusement.

These and other objects, features and advantages of the present invention will become more readily apparent from the following detailed description when taken in conjunction with the accompanying drawings.

DESCRIPTION OF THE PREFERRED EMBODIMENTS

Figure 1:
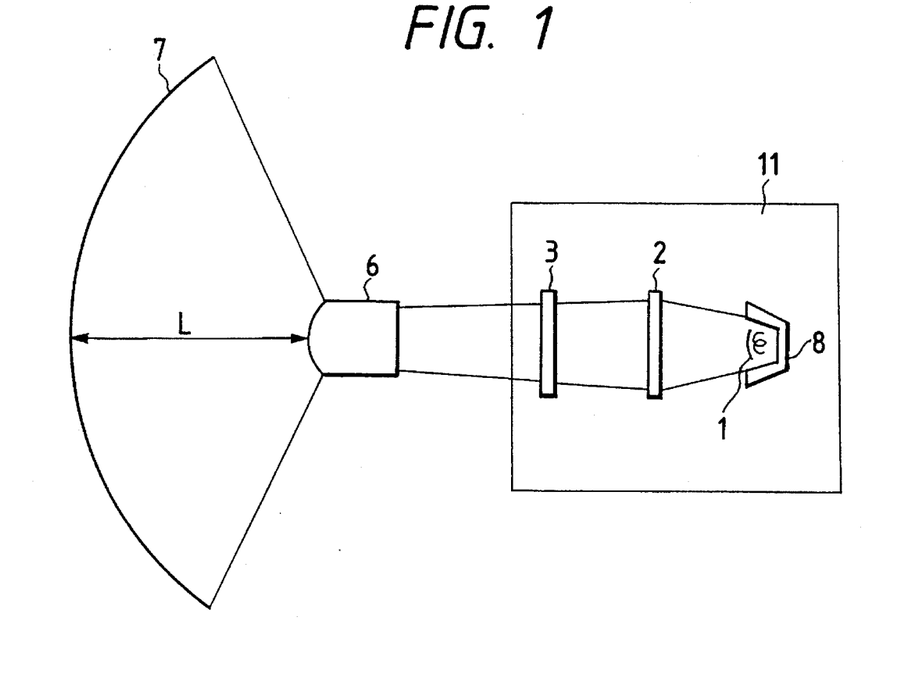
FIG. 1 is a schematic diagram of a liquid crystal projector system according to an embodiment of the present invention.

FIG. 1 is a schematic diagram of a liquid crystal projector system according to an embodiment of the present invention wherein light from a light source 1 is condensed onto a liquid crystal panel 3 by means of a lens 2, allowing a picture signal fed to the panel 3 to be imaged on the panel and by way of a projection lens 6 projected onto a curved dome-like screen 7 on an enlarged scale.

As the light source 1, there may be used, for example, a halogen lamp, xenon lamp or metal halide lamp, of which the metal halide lamp is now most suitable in point of luminous efficiency and service life. A reflecting mirror 8 for the light source 1 is used for effective utilization of the light emitted from the light source 1. For example, the shape of the reflecting mirror 8 is spherical, parabolic or elliptic, and it is configured so that the quantity of light incident on the lens 2 is as uniform as possible.

The lens 2 receives the light emitted from the light source 1 and condenses the light in a picture plane size of the liquid crystal panel 3. In this embodiment, a Fresnel lens of narrow width is used as the lens 2, although it is not always necessary to use a Fresnel lens. The lens 2 may comprise plural lenses. A certain distance is required from the lens 2 to the light source 1 for ensuring a cooling effect utilizing the flow of air. The lens 2 is formed of substantially transparent material such as glass or plastic material. In the light from the light source 1 there are included infrared light and ultraviolet light in addition to visible light, but the former two are not necessary in this system. In particular, infrared light acts as a heat source and exerts a bad influence on circuits, etc., so it is necessary to reduce the amount of infrared light. The lens 2 also functions to reduce such infrared light and ultraviolet light. As to infrared light and ultraviolet light, they can be reduced to a certain extent by using a cold mirror or a cold filter and an ultraviolet light cut-off filter in addition to the lens 2. Also, with respect to heat generated by infrared light, cooling can be effected by means of a cooling device such as a cooling fan or the like.

The liquid crystal panel 3 is not specially limited if only it received the light from the light source 1 which has passed through the lens 2 and forms an image thereon. The panel may be, for example, configured as three panels separated in three colors RGB instead of a single liquid crystal panel 3. In this embodiment, the liquid crystal panel 3 is constituted by a single TFT liquid crystal panel of full color which permits high definition. It is desired that parallel rays of light be applied to the liquid crystal panel 3 which serves for diminishing the loss of light in the liquid crystal panel 3. The portion from the light source 1 and including the liquid crystal panel 3 is designated as a projector body 11 and contained in a housing. In the projector body 11 there are included a circuit portion such as a drive circuit and a cooling device for the circuit.

The projection lens 6, which is a fish-eye lens, for example, has a curvature of field approximately conforming to the screen shape curvature and has an angle of projection of not smaller than 120 degrees and may be contained in a housing separate from the projector body 11. It may comprise plural lenses. The curved dome-like screen 7 has a shape constituted by a portion of a solid of revolution of a curved line. By using the projection lens 6, e.g. fish-eye lens, having a curvature of field approximately conforming to the screen shape curvature and having an angle of projection of not smaller than 120 degrees, it is possible to obtain a wide projection angle 120 degrees or more and an image of a large picture plane (at least 100 inch diagonal length) can be obtained in a shorter distance than the distance (3 to 4 meters) from the conventional projection lens having a small projection angle up to the screen. Consequently, the space for enlarged projection can be made smaller, and hence, it is possible to diminish the space occupied by the system during projection. The large picture plane of 100 diagonal inches is here expressed for convenience sake as a picture plane having a diagonal line length of 100 inches and an aspect ratio of 3:4. Since the image is projected at a short distance and at a wide field angle (120 degrees or more) by the projection lens 6, the viewer can obtain a feeling of image reality at a short distance. Besides, the dome-like screen 7 gives the viewer a sense of oppression and that of distance which are based on the screen shape. As a result, this system permits the viewer to enjoy images having a sense of presence.

Figure 3A:
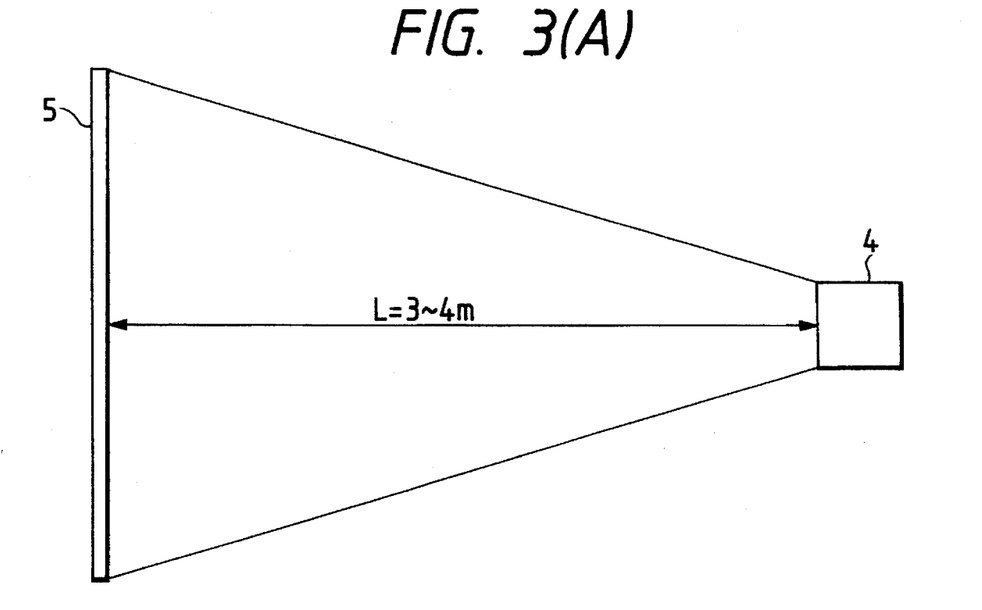
FIGS. 3(A) and 3(B) are respective explanatory diagrams for providing a comparison between the projection distance from a projection lens to a screen in the conventional liquid crystal projector system and that from a projection lens to a dome-like screen in the liquid crystal projector system according to the invention.
Figure 3B:
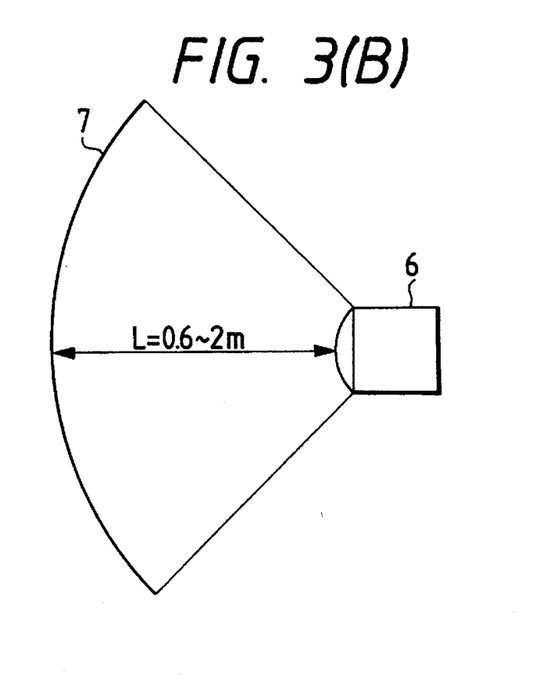

FIGS. 3(A) and 3(b) are explanatory diagrams for providing a comparison between the projection distance from the projection lens to the screen in the conventional liquid crystal projector system and that from the projection lens to the dome-like screen in the liquid crystal projector system of the present invention. FIG. 3(A) shows the conventional system in which the distance L from the projection lens 4 to the screen 5 is 3 to 4 meters, while FIG. 3(B) shows the system of the present invention in which, by using the projection lens 6 described above having the curvature of field conforming to the screen shape and a projection angle of at least 120 degrees, an image over the same size of a picture plane as in the conventional system can be obtained at a projection distance L from the projection lens 6 to the dome-like screen 7 of 0.3 to 2 meters which is substantially shorter than that (3 to 4 meters) from the projection lens to the screen in the conventional system.

In the case of a projector system installed indoors, it is desirable that the overall system length be within about 3 meters. Therefore, the projection distance L from the projection lens 6 to the dome-like screen 7 is preferably not longer than 1.5 meters, taking into account both the required distance from the light source 1 to the projection lens 6 and the space which is necessary structurally.

On the other hand, in the case where the projection angle is set as large as 180 degrees, the screen is made semispherical and the projection lens is positioned at the center of the sphere, the projection length L from the projection lens 6 to the dome-like screen 7 required for obtaining an image 100 inches or larger in the length of a diagonal line is 0.6 meter or longer. If the projection distance L is set smaller than 0.6 meters, the image on the screen will become smaller than 100 inches as a diagonal line length, thus deteriorating the sense of presence, although the system itself can be rendered compact. When projection is made at the same distance using both a projection lens having a projection angle of, about 120 degrees, which is smaller than 180 degrees and a projection lens having a projection angle of 180 degrees, the image size on the screen is smaller in the use of the former projection lens, and hence, the sense of presence is deteriorated. Thus, in order to make the image on the screen larger, it is necessary to make the projection distance longer, that is, it is necessary that the projection distance L in the use of the projection lens having a projection angle of 120 degrees be made longer than 0.6 meters. It is preferable that the projection distance L from the projection lens 6 up to the dome-like screen 7 be in the range of 0.3 to 2 meters, more preferably 0.6 to 1.5 meters.

Figure 4A:
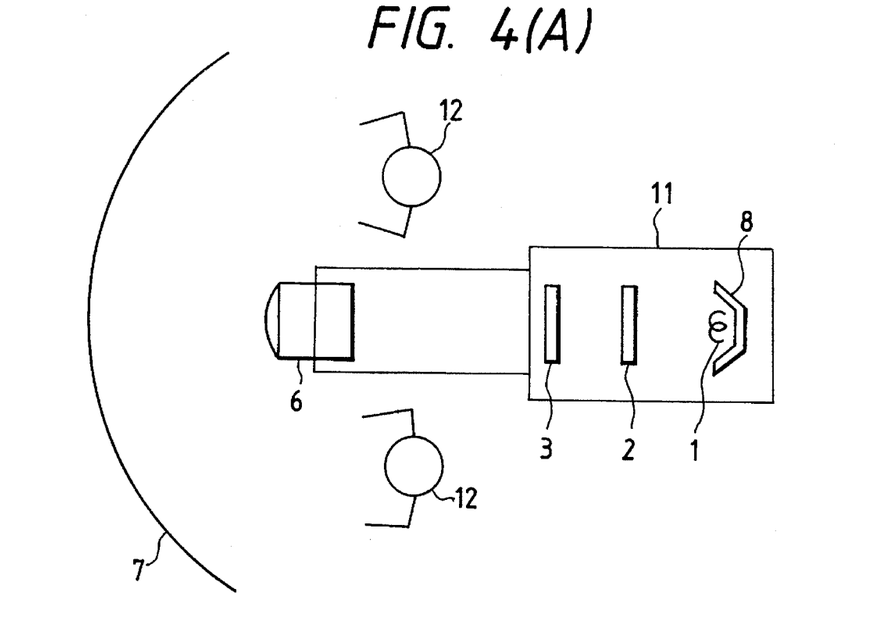
FIGS. 4(A) and 4(B) show a plan view and a side view, respectively, of a positional relation between viewers and a projector body of a liquid crystal projector system according to another embodiment of the invention.
Figure 4B:
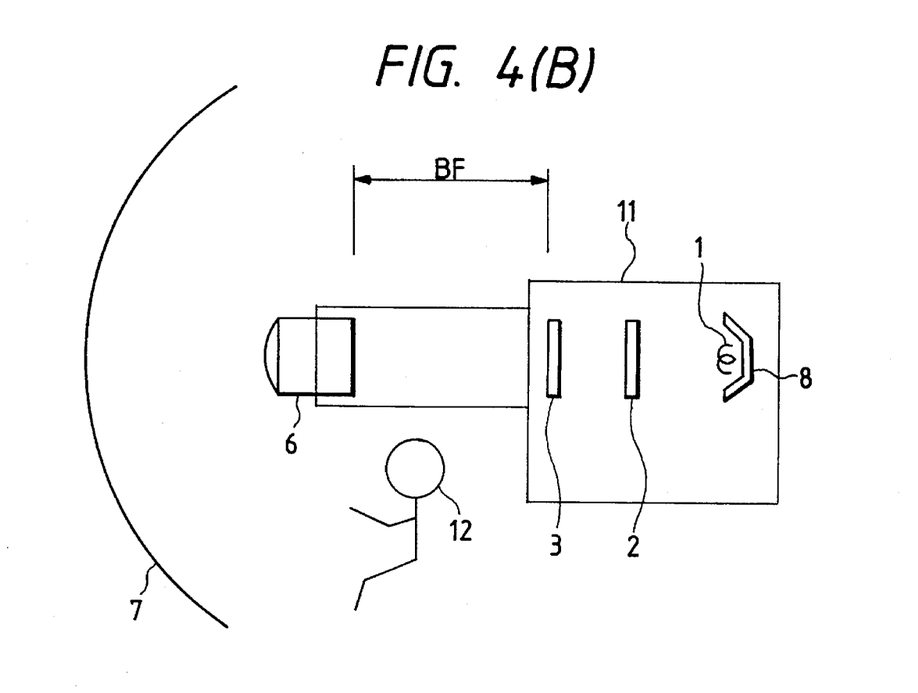

FIGS. 4(A) and 4(B) show a plan view and a side view, respectively, of a positional relation between viewers and a projector body of a liquid crystal projector system according to another embodiment of the present invention. These figures are representational and do not define the size of each portion thereon. Further, although the number of viewers shown in the figures is two, it may be one or several.

In a projector body 11 extending from a light source 1 to a liquid crystal panel 3, there are present both heat generated from the light source and a cooling device for cooling the heat. Thus, there arise both heat from the light source and noise from the cooling device, etc. If the heat and noise are transmitted to viewers 12 who play a game, the viewers will have unpleasant feeling. In this embodiment, in order that the viewers 12 can play the game pleasantly, the projector body 11 is disposed in a position to the rear of the viewers 12. In this construction, a back focal length (BF) of a projection lens 6 is made longer according to the projection distance from the projection lens to the dome-like screen 7. The projection lens 6 may be arranged in a housing separate from and coupled to the projector body.

However, the overall length of the system becomes longer with increase in back focal length (BF), so it is desirable that the spacing between the viewers 12 and the front of the projector body 11 be in the range of 0.1 to 0.5 meters, preferably 0.2 to 0.3 meters. In the case where the viewers 12 are positioned at a distance of 1 to 2 meters from the dome-like screen 7, the projection distance L from the projection lens 6 up to the dome-like screen 7 is 0.3 to 2 meters and the spacing between the viewers 12 and the projector body 11 is 0.1 to 0.5 meters, the back focal length (BF) of the projection lens 0.1 to 2.2 meters. When the viewers 12 are positioned at a distance of 1.5 meters from the dome-like screen 7, the projection distance L from the projection lens 6 up to the dome-like screen 7 os 0.6 to 1.5 meters and the spacing between the viewers 12 and the projector body 11 is 0.2 to 0.3 meters, the back focal length (BF) of the projection lens 6 is suitably in the range of 0.2 to 1.2 meters.

In the case of a long back focal length (BF) of the projection lens 6, there may be used a relay lens, or the optical axis may be bent using a mirror or the like. By so bending the optical axis, it is made possible to reduce the space of the projecting portion from the light source 1 to the projection lens 6.

When the image from the projection lens 6 is enlarged to a large picture plane of 100 diagonal inches or more and is projected on the dome-like screen 7, the picture element size of the image projected on the same screen depends on the number of picture elements in the liquid crystal panel 3. Therefore, even in the case of a liquid crystal panel having a coarse picture element pitch, if the panel size is large, it is possible to make the picture element pitch on the screen small in correspondence to a small magnification of enlargement from the liquid crystal panel to the dome-like screen 7. However, if light is incident in parallel form on the liquid crystal panel 3 when the panel size is made large, it is required that the incident aperture of the projection lens 6 be also made large.

Figure 5:
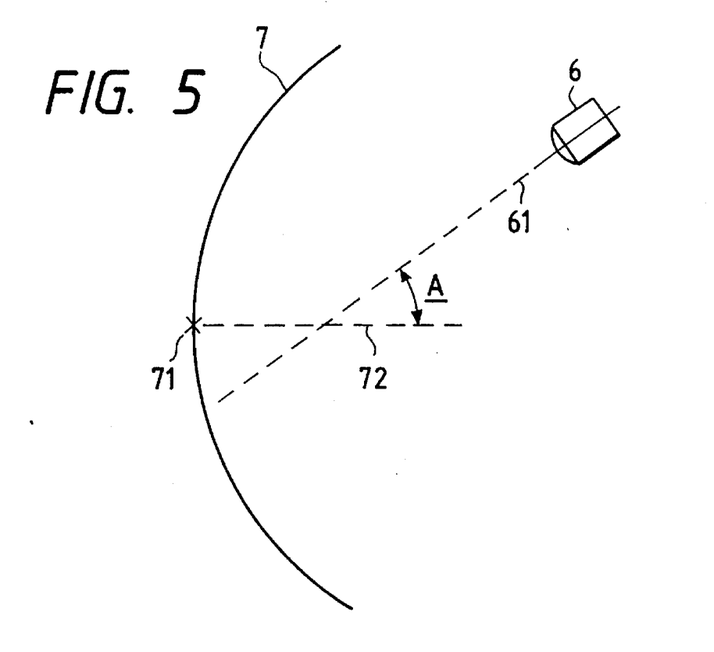
FIG. 5 is an explanatory diagram showing a positional relation between a projection lens and a dome-like screen in a liquid crystal projector system according to a further embodiment of the invention.

FIG. 5 is an explanatory diagram showing a positional relation between a projection lens and a dome-like screen in a liquid crystal projector system according to a further embodiment of the present invention. As to the positional relation between the projection lens 6 and the dome-like screen 7, the one shown in FIG. 1 is the best in point of projection, but since the lens-screen distance is as short as 0.6 to 1.5 meters, the projecting portion from the light source 1 to the projection lens 6 is sometimes an obstacle to the viewer. In this embodiment, in view of the point just mentioned, the angle A between an optical axis 61 of light emanating from the projection lens 6 and a perpendicular line 72 drawn from a screen center 71 of the dome-like screen 7, namely, the degree of decentering, is set at a value exceeding 20 degrees. In this case, the optical axis 61 need not pass through the screen center 71. Since the distance between the projection lens 6 and the dome-like screen 7 is as short as 0.6 to 1.5 meters and the depth of field of the projection lens 6, e.g. fish-eye lens, is pan-focused, the image projected in the above state is in focus. In other words, the projecting portion from the light source 1 to the projection lens 6 need not be disposed directly in front of the screen, and hence, the projector body 11 from the light source 1 to the liquid crystal panel 3 can be disposed away from the viewers 12 who play a game.

Figure 6:
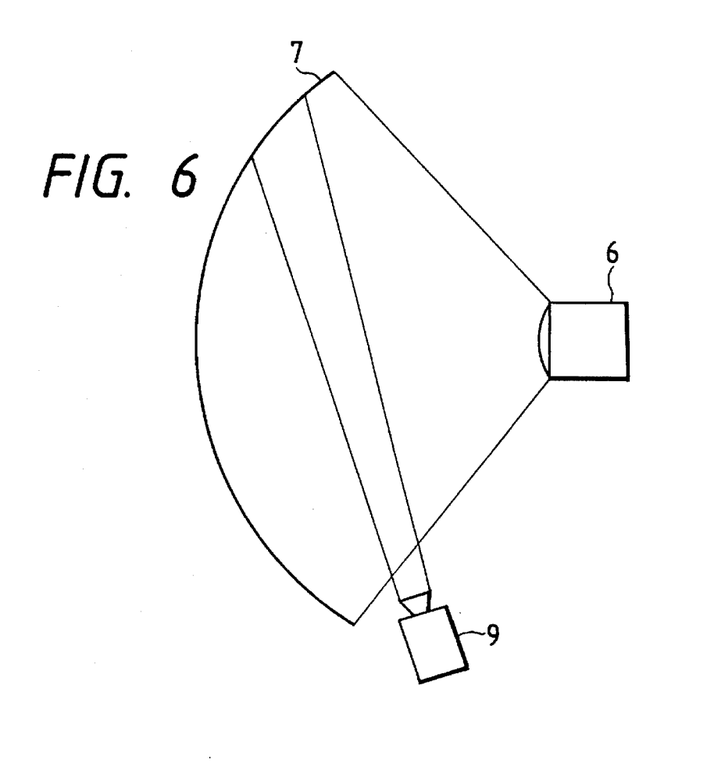
FIG. 6 is a diagram showing a principal portion of a liquid crystal projector system according to another embodiment of the invention.

FIG. 6 is a diagram showing a principal portion of a liquid crystal projector system according to another embodiment of the present invention. This projector system comprises the ultra-wide angle liquid crystal projector system illustrated in FIG. 1, and a second information projecting portion 9. According to the projector system of this embodiment, score, characters such as information of a competitor in a competition type game, images and other pieces of information, are projected in a combined form on the screen, so that the system is rich in variety of amusement.

The second information projecting portion 9 is not limited to a liquid crystal projector and may be a projection tube type, a video projector or a slide projector. The second information projecting portion 9 is disposed in a position where it is not an obstacle to the viewers. According to the present technical level, when the image on the liquid crystal panel 3 is projected enlargedly on the dome-like screen 7 of a large picture plane not smaller than 100 diagonal inches by using the projection lens 6, the picture element pitch on the screen becomes fairly coarse. Consequently, character information is difficult to read although this problem will be solved in the near future because of the recent tendency to a higher definition of liquid crystal panel. Therefore, if character information is projected on part of the screen using the second information projecting portion 9, even character information can be projected in a satisfactory manner because the projection magnification is not so large in comparison with the case where the image on the liquid crystal panel 3 is projected on an enlarged scale using the projection lens 6.

Figure 7A:
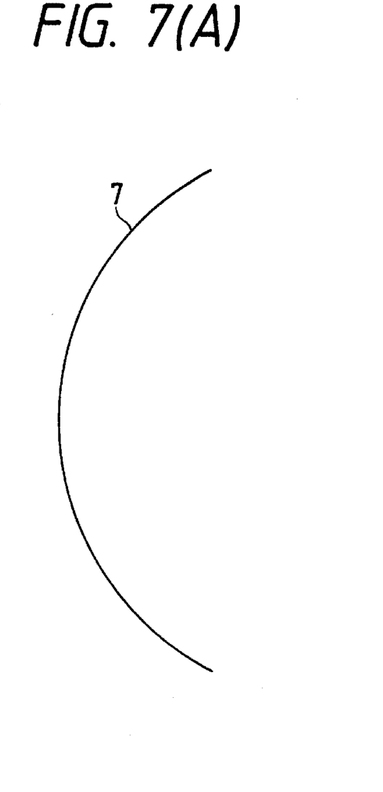
FIGS. 7(A) and 7(B) show respectively a sectional view and a front view, showing a dome-like screen used in a liquid crystal projector system according to still another embodiment of the invention.
Figure 7B:
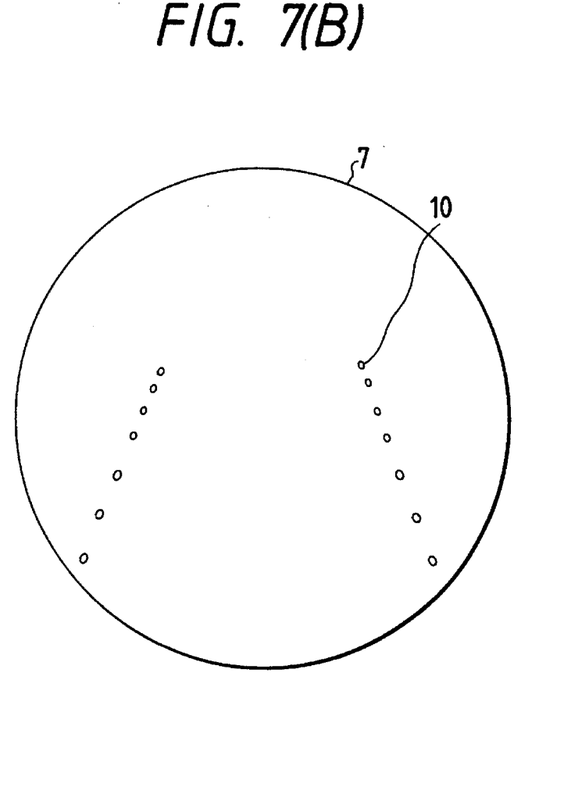

FIGS. 7(A) and 7(B) show respectively a sectional view and a front view of a dome-like screen which is used in a liquid crystal projector system according to an embodiment of the present invention. In this embodiment, the surface of the dome-like screen 7 is provided with a dot-like light source 10. Plural dot-like light sources 10 may be provided, or a group of such dot-like sources may be provided. Such dot-like light sources may be provided throughout the entire surface of the screen 7. The dot-like light sources 10 are energized interlockedly with or independently of the image projected on the screen by the ultra-wide angle liquid crystal projector system, and by combining the image obtained on the screen by the ultra-wide angle liquid crystal projector system with other information obtained by the dot-like light sources 10, it is made possible to obtain strange images so far not obtainable by only the ultra-wide angle liquid projector system, thus affording a projector system rich in variety of amusement. Examples of the other information includes moving body information and a target information.

From the standpoint of power consumption, life, cost, freedom of hue and response speed, light emitting diodes (LED) are preferred as the dot-like light sources 10, although any other suitable dot-like light sources than LEDs may be utilized. It is also possible to project character information on the screen using the dot-like light sources 10. In the case where the dot-like sources 10 are in the form of group or occupy the whole surface of the screen, the way of use richer in variety can be attained by using a liquid crystal for the display of color images in place of LEDs.

Although the above description has referred to a game system, it is apparent that the present invention is also applicable to other apparatuses. Further, the invention may be embodied in other specific forms without departing from the spirit or essential characteristics thereof. The present embodiment is therefore to be considered in all respects as illustrative and not restrictive, the scope of the invention being indicated be the appended claims.

We claim:

1. An ultra-wide angle liquid crystal projector system comprising a light source, a liquid crystal panel, a curved screen, and a projection lens for projecting in accordance with light emitted by the light source an image formed on the liquid crystal panel onto the curved screen, the projection lens having a curvature of field substantially conforming to the shape of the curved screen and having an angle of projection of at least 120 degrees, the projection lens being disposed with respect to the curved screen so that a distance along an optical axis from an exit surface of the projection lens to the curved screen is less than 3 meters.

2. An ultra-wide angle liquid crystal projector system according to claim 1, wherein the distance from the exit surface of the projection lens to the curved screen is in the range of 0.3 to 2 meters.

3. An ultra-wide angle liquid crystal projector system according to claim 2, wherein the distance from the exit surface of the projection lens to the curved screen is in the range of 0.6 to 1.5 meters.

4. An ultra-wide angle liquid crystal projector system according to claim 1, wherein the projection lens has a back focal length in the direction of the liquid crystal panel in the range of 0.1 to 2.2 meters.

5. An ultra-wide angle liquid crystal projector system according to claim 4, wherein the back focal length of the projection lens is in the range of 0.2 to 1.2 meters.

6. An ultra-wide angle liquid crystal projector system according to claim 1, wherein the light source and the liquid crystal panel are disposed in a projector body separate from and coupled to the projection lens, at least the projector body being disposed rearwardly of a viewer.

7. An ultra-wide angle liquid crystal projector system according to claim 6, wherein the projector body includes a reflecting mirror for the light source, a condensing lens disposed between the light source and the liquid crystal panel, and a cooling device.

8. An ultra-wide angle liquid crystal projector system according to claim 1, wherein an optical axis of light projected from the projection lens is disposed at an angle greater than 20 degrees with respect to a perpendicular line extending from the center of the screen.

9. An ultra-wide angle liquid crystal projector system according to claim 1, wherein the projection lens is a fish-eye lens.

10. An ultra-wide angle liquid crystal projector system according to claim 1, wherein the curved screen is a dome-like screen.

11. An ultra-wide angle liquid crystal projector system according to claim 10, wherein the curved screen is substantially semispherical.

12. An ultra-wide angle liquid crystal projector system according to claim 1, further comprising additional projection means for projecting additional information onto the curved screen.

13. An ultra-wide angle liquid crystal projector system according to claim 1, wherein the curved screen is provided with at least one dot-like light source thereon, the at least one dot-like light source being selectively energized.

14. An ultra-wide angle liquid crystal projector system comprising a light source, a liquid crystal panel having an image formed thereon, a curved screen and a projection lens for projecting an image formed on the liquid crystal panel by the light source onto the curved screen, the projection lens having a curvature of field substantially conforming to the shape of the curved screen and an angle of projection of at least 120 degrees, the projection lens having a back focal length in the direction of the liquid crystal panel in the range of 0.1 to 2.2 meters, and the projection lens being disposed with respect to the screen so that a distance from an exit surface of the projection lens to the curved screen is less than 3 meters.

15. An ultra-wide angle liquid crystal projector system comprising a light source, a liquid crystal panel having an image formed thereon, a curved screen and a projection lens for projecting an image formed on the liquid crystal panel by the light source onto the curved screen, the projection lens having a curvature of field substantially conforming to the shape of the curved screen and an angle of projection of at least 120 degrees, the projection lens having a back focal length in the direction of the liquid crystal panel in the range of 0.1 to 2.2 meters, and the distance from the exit surface of the projection lens to the curved screen being in a range of 0.3 to 2 meters.

* * * * *